United States Patent [19]

Mochida et al.

[11] Patent Number: 5,455,089
[45] Date of Patent: Oct. 3, 1995

[54] MULTILAYER LAMINATED PRESS-FORMED PACKAGING CONTAINERS

[75] Inventors: Takaaki Mochida; Toshifumi Tanabashi, both of Yokohama; Muneki Yamada, Fujisawa, all of Japan

[73] Assignee: Toyo Seikan Kaisha Ltd., Tokyo, Japan

[21] Appl. No.: 997,192

[22] Filed: Dec. 28, 1992

[30] Foreign Application Priority Data

Dec. 27, 1991 [JP] Japan .................................. 3-347463
Dec. 27, 1991 [JP] Japan .................................. 3-347464

[51] Int. Cl.⁶ .................. A23L 3/00; B65D 7/00; B32B 27/00; B32B 27/08
[52] U.S. Cl. .................. 428/35.8; 426/113; 426/126; 428/35.9; 428/332; 428/337; 428/422; 428/460; 428/473.5; 428/474.4
[58] Field of Search .................. 428/35.2, 35.3, 428/35.7, 35.8, 332, 337, 336, 421, 457, 458, 473.5, 474.4, 474.7, 422, 460; 426/106, 113, 126, 127, 412, 415

[56] References Cited

U.S. PATENT DOCUMENTS

| | | | |
|---|---|---|---|
| 3,890,448 | 6/1975 | Ito | 426/126 |
| 4,177,320 | 12/1979 | Yoshimura | 428/419 |
| 4,291,085 | 9/1981 | Ito et al. | 428/215 |
| 4,353,950 | 10/1982 | Vassiliou | 428/195 |
| 5,106,682 | 4/1992 | Matsushita et al. | 428/324 |
| 5,120,826 | 6/1992 | Vora et al. | 528/350 |
| 5,175,367 | 12/1992 | Feiring et al. | 564/309 |

FOREIGN PATENT DOCUMENTS 2843681 10/1978 Germany.

OTHER PUBLICATIONS

Database WPI, Section Ch, Week 9019, Derwent Publications Ltd., London, GB; Class A82, AN 90-144974 & JP-A-2 092 536 (Nippon Steel Corp) Apr. 3, 1990 *abstract*.

Database WPI, Section Ch, Week 9133, Derwent Publications Ltd., London, GB; Class A82, AN 91-243476 & JP-A-3 159 736 (Nippon Steel Corp) Jul. 9, 1991 *abstract*.

Patent Abstracts of Japan, vol. 006, No. 103 (E-112), Jun. 12, 1982 & JP-A-57 034 650 (Toshiba Battery) Feb. 25, 1982 *abstract*.

*Primary Examiner*—Paul J. Thibodeau
*Assistant Examiner*—Stephen Sand
*Attorney, Agent, or Firm*—Sughrue, Mion, Zinn, Macpeak & Seas

[57] ABSTRACT

A packing container for cooking retort-sterilized content obtained by press-forming a laminate material which comprises a surface-treated steel foil, a primer layer of a composition of a polyamideimide and an epoxy resin provided on at least one surface of said steel foil, and an overcoating layer of a resin composition containing a composition of a polyamideimide and an epoxy resin, and a fluorine-type resin in an amount of from 60 to 300 parts by weight 100 parts by weight of said composition an provided on said primer layer. The packaging container is capable of safely preserving the content for extended periods of time without requiring any particular means such as refrigeration. And at the time when it is to be eaten after opened. the package container can be simply put to various kinds of ranges, a microwave oven or an oven toaster so as to be cooked being heated at a high temperature, causing little chemical change or physical change during the preservation or the cooking, featuring excellent resistance against extraction, resistance against migration and resistance against scorching, and further effectively preventing the cracks.

3 Claims, 2 Drawing Sheets

MULTILAYER LAMINATED PRESS-FORMED PACKAGING CONTAINERS

BACKGROUND OF THE INVENTION

1. Field of the Invention

The present invention relates to press-formed containers having excellent press-formability, sterilizing property by retorting, adaptability of being heated by direct flame, as well as excellent workability.

2. Description of the Prior Art

A container containing food that can be heated by direct flame prior to eating can be represented by, for example, the one made of an aluminum foil that is press-formed into a desired shape and is fitted with a closure. This container, however, has a low rigidity, easily deforms, and permits the content to be scorched and stuck to the container.

The containers made of such a base material as a metal foil or the like are usually provided with a protection coating composed of a variety of thermosetting resin paints and thermoplastic resin paints in order to impart surface protection and functions. Among such paints, the thermoplastic paints have an advantage that no baking is required for curing the resin but have a defect in that they have poor heat resistance when they are formed into a coating. The thermosetting paints, on the other hand, have excellent heat resistance compared to the thermoplastic paints but are still defective in regard to heat resistance, resistance against extraction, or resistance against scorching.

As paints for cans that exhibit excellent resistance against hot water and corrosion, there have been known a variety of epoxy-phenol paints, epoxy-amino paints, and epoxy-acrylic paints that have excellent adhesiveness to the base materials such as of metals, as well as resistance to the heat and hot water capable of withstanding the sterilization by retorting. When the container containing content is put into an oven toaster, a microwave oven or directly on the flame to cook it by heating, however, the coated film is softened, the components of the coated resin elute out into the content and are often scorched. One of the reasons is that though the epoxy resin component exhibits excellent adhesiveness to the base material as well as excellent reactivity to other resin components, it has a tendency to be softened even at a relatively low temperature, and that the cured film still contains uncured components of relatively low molecular weights.

It has been proposed to use polyimide-type paints such as a polyimide, a polyimideimidazopyrolone, and the like as paints for being applied to the inner surfaces of the containers that will be heated for cooking. However, although these paints exhibit excellent heat resistance, they are considerably expensive and require special solvents. Therefore, these paints are not utilizable for the inexpensive containers that are to be heated for cooking.

Moreover, there have been known fluorine-type resin paints such as a polytetrafluoroethylene and the like as a coating agent to be applied on the inner surfaces of such containers for cooking by heating as a flying pan and the like. However, though the fluorine-type resins exhibit excellent heat resistance and resistance against scorching, they still are expensive and adhere poorly to the material base unless a special primer coating is provided. Therefore, the fluorine-type resins are not, either, utilizable for the one-way and inexpensive containers that are to be heated for cooking.

In general, even the thermosetting paints tend to be softened to some extent at high temperatures, permitting the resin components to migrate (extracted) into the content due to the action of hot water. And by cooking, paints are also scorched due to the mutual action relative to the content that is dehydrated.

It may appear that the above problems can be solved if the curing degree of the resin components is enhanced, i.e., if the degree of crosslinking is enhanced. However, when the resin components are crosslinked to a high degree, the coated film becomes very brittle and cannot be applied to the container in the form of a coating. Or, the coated film is peeled off or is removed upon the impact when, for example, the container falls or comes into collision. Moreover, adhesiveness to the base material and corrosion resistance decrease, too. Furthermore, for such applications as protecting the one-way, disposable and inexpensible containers that will be heated for cooking, the painting resin must be a cheaply available one and that can be easily applied.

Moreover, when the container is filled with a content, sealed, and is subjected to the sterilization by retorting, an interface peeling develops between the inner coating and the metal material, or so-called under-film corrosion develops under the inner coating, permitting iron to be eluted out or resulting in the leakage due to pitting no matter how the inner coating exhibits excellent properties to some extent for the content that is heat-cooked. Thus, there has not yet been provided an inner coating that is satisfactory with regard to corrosion resistance, content preservability and flavor retentivity.

SUMMARY OF THE INVENTION

The object of the present invention therefore is to provide a press-formed container that exhibits excellent adhesiveness to a metal base and excellent heat resistance as well as workability that withstands the press-forming, and that does not permit the coated film to be peeled off or damaged and further more does not permit the metal material to be corroded even after it received impact to such a degree that there is left a trace of impact or even after it is subjected to a severe hot-water treatment such as sterilization by retorting.

Another object of the present invention is to provide a packaging container for cooking retort-sterilized content, that is capable of safely preserving the content for extended periods of time without requiring any particular means such as refrigeration, and which, at the time when it is to be eaten, can be simply put after it is opened to various kinds of ranges, a microwave oven or an oven toaster so as to be cooked being heated at a high temperature, causing little chemical change or physical change during the preservation or the cooking, and further featuring excellent resistance against extraction, resistance against migration and resistance against scorching.

According to a first aspect of the present invention, there is provided a press-formed container comprising a surface-treated steel foil and a coating layer of a resin composition which is provided on at least one surface of said steel foil and contains a polyamideimide and a fluorine-type resin in an amount of 60 to 300 parts by weight per 100 parts by weight of the polyamideimide.

According to the first aspect of the present invention, furthermore, there is provided a packaging container for being heated by direct flame which is obtained by draw-forming a laminated material which comprises a surface-treated steel foil and a coating layer of a resin composition which is provided on at least one surface of said steel foil and contains a polyamideimide and a fluorine-type resin in an amount of 60 to 300 parts by weight per 100 parts by weight of the polyamideimide in a manner that said coating layer is on the inside.

According to the second aspect of the present invention, there is provided a press-formed container comprising a surface-treated steel foil, a primer layer of a polyamideimide provided on at least one surface of said steel foil, and an overcoating layer of a resin composition which is provided on said primer layer and contains a polyamideimide and a fluorine-type resin in an amount of 60 to 300 parts by weight per 100 parts by weight of said polyamideimide.

According to the second aspect of the present invention, furthermore, there is provided a heat-sealable press-formed container obtained by draw-forming a laminated material which comprises a surface-treated steel foil, a primer layer of a polyamideimide provided on at least one surface of said steel foil, and an overcoating layer of a resin composition which contains a polyamideimide and a fluorine-type resin in an amount of 60 to 300 parts by weight per 100 parts by weight of said polyamideimide on said primer layer, in a manner that said overcoating layer is on the inside, wherein a heat-sealable resin containing a heat-sealable resin is provided in advance on said overcoating layer at a flange portion of the container.

According to the third aspect of the present invention, there is provided a press-formed container obtained by press-forming a laminated material which comprises a surface-treated steel foil and a coating layer of a resin composition which contains a composition of a polyamideimide and an epoxy resin, and a fluorine-type resin in an amount of 60 to 300 parts by weight per 100 parts by weight of said composition.

According to the fourth aspect of the present invention, there is provided a press-formed container obtained by press-forming a laminated material which comprises a surface-treated steel foil, a primer layer of a composition of a polyamideimide and an epoxy resin provided on at least one surface of said steel foil, and an overcoating layer of a resin composition containing a composition of a polyamideimide and an epoxy resin, and a fluorine-type resin in an amount of 60 to 300 parts by weight per 100 parts by weight of said composition provided on said primer layer, in a manner that said overcoating layer is on the inside, wherein a heat-sealable resin containing a heat-sealable resin is provided in advance on said overcoating layer at a flange portion of the container.

The laminated materials for press-working used for the first and second aspects of the present invention exhibit excellent adhesiveness to a metal base, a high degree of heat resistance, workability to a degree that withstands the press-working, and does not permit the coated film to be peeled off or damaged even after it has received impact to such a degree that there is left a trace of hit. In particular, the laminated material used for the second aspect which comprises a double coating of a primes and an overcoating withstands the retort sterilization.

The press-formed container of the present invention obtained by press-forming the laminated material into a container permits chemical change or physical change to take place little when it is heated at a high temperature in a range, in a microwave oven or in an oven toaster, and features are excellent resistance against extraction, resistance against migration and resistance against scorching. In particular, the press-formed contained of the second aspect comprising a double coating of a primer and an overcoating features enhanced preservability for the content through retort sterilization.

Moreover, the press-formed container obtained by the third and fourth aspects of the present invention exhibits further improved heat resistance and workability, and effectively prevents cracks from developing, in addition to the effects obtained by the above first and second aspects.

DETAILED DESCRIPTION OF THE INVENTION

Figure 1:
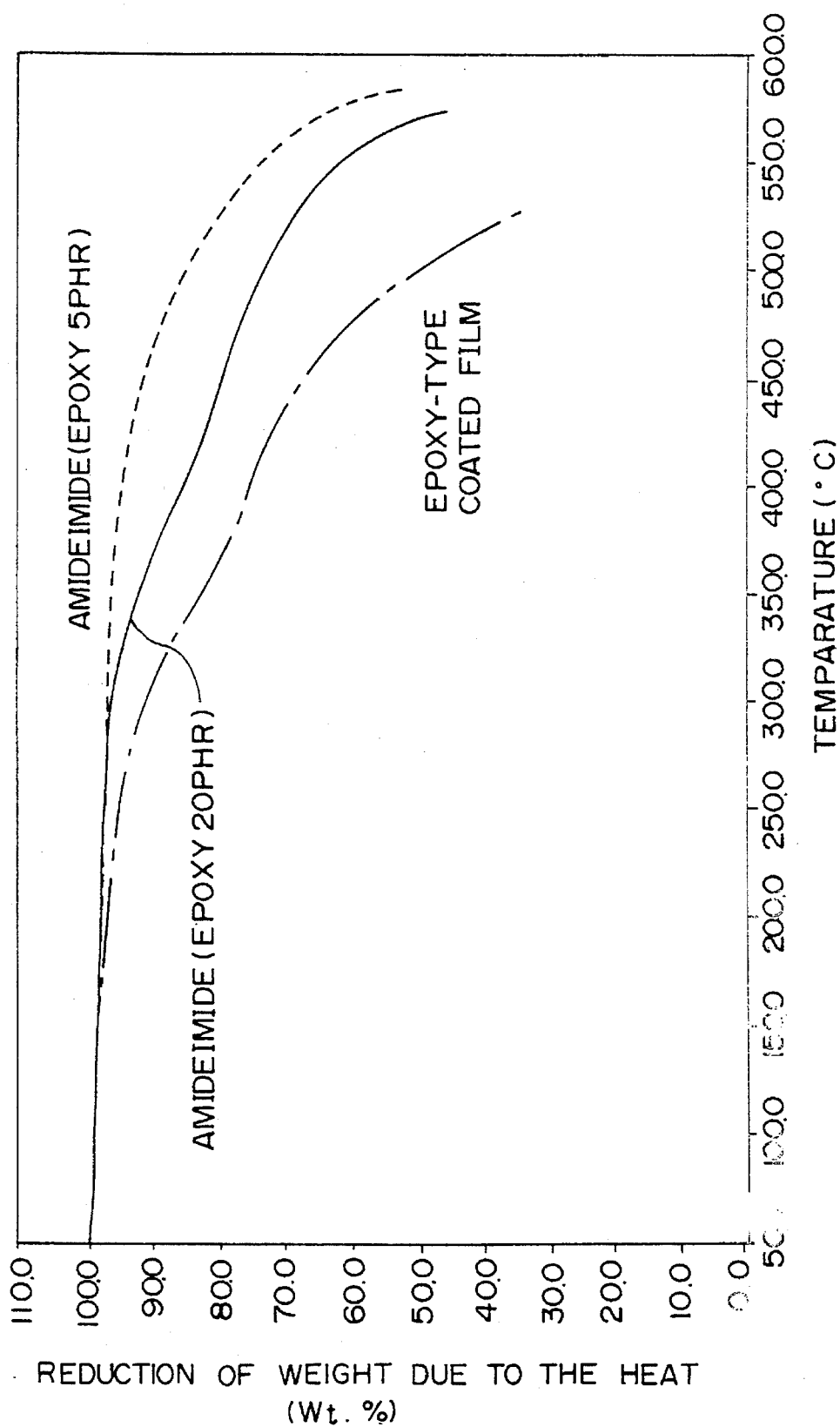
FIG. 1 is a diagram showing a relationship between the temperature and the reduction of weight due to the heating of a polyamideimide blended with an epoxy resin for explaining the third and fourth aspects of the present invention.

The present invention is based on a discovery that a laminated material comprising a surface-treated steel foil and a coating layer of a resin composition which contains a polyamideimide and a fluorine-type resin at a particular weight ratio, or a laminated material comprising a surface-treated steel foil, a primer layer of a polyamideimide, and an overcoating layer of a resin composition containing a polyamideimide and a fluorine-type resin at a particular weight ratio provided on said primer layer, exhibits (1) excellent adhesiveness to a metal base, (2) heat resistance of a high degree, (3) press-workability of a high degree, (4) scratch resistance to withstand impact such as traces of hit, and (5) excellent content-cooking properties such as extraction resistance, migration resistance and scorch resistance in combination.

The present invention uses a surface-treated steel foil among various other metals because of the reason that it has a large rigidity and a large mechanical strength compared with other metal blanks such as aluminum and the like and that it can be easily draw-formed by pressing into containers. Moreover, the surface-treated steel foil exhibits excellent adhesiveness to a coating layer that will be mentioned later, does not lose the adhesiveness even after it is press-formed, and develops little corrosion under the coated film (under-film corrosion).

The inner coating layer of a resin composition which contains a polyamideimide and a fluorine-type resin at a particular weight ratio has a coating structure in which the polyamideimide forms a continuous phase and the fluorine-type resin forms a dispersion phase. The aforementioned actions (1) to (5) are exhibited in an optimum combination owing to the division of functions by the two phases and cooperative actions thereof.

The polyamideimide in the form of polyamide amic acid is soluble in a solvent, and forms a vehicle of coating which is excellent in wetting property and dispersion property and further forms upon baking a completely cyclized polyamideimide. The coated film of this polyamideimide serves as an enamel film exhibiting excellent heat resistance, adhesiveness and rigidity.

On the other hand, the fluorine-type resin is one of the thermoplastic resins that exhibits most excellent heat resistance, and is further chemically inactive and has a low friction of coefficient which are properties not found in other resins. According to the present invention, these properties of the fluorine-type resin are utilized by permitting the fluorine-type resin to exist as a dispersion phase in the polyamideimide.

First, during the press-forming, the polyamideimide exhibits strong adhesiveness to the surface-treated steel foil and strongly holds the fluorine-type resin. The fluorine-type resin, on the other hand, imparts excellent lubricating property during the press-forming. Moreover, the fluorine-type resin that exists as a dispersion phase in the polyamideimide imparts plastic flow that withstands the draw-forming by press.

Second, both the polyamideimide and the fluorine-type resin lose the weight little and permit the properties to change little by the heating even under the conditions of being heated at high temperatures such as being directly exposed to the flame, presumably accounting for obtaining excellent heat resistance and excellent cooking properties upon the heating with direct flame. Moreover, chemical inactivity and small coefficient of friction of the fluorine-type resin in the coating account for excellent resistance against scorching.

According to the third and fourth aspects of the present invention, an epoxy resin is further contained in addition to those of the first and second aspects that uses the polyamideimide and the fluorine-type resin, in order to obtain distinguished effects.

FIG. 1 is a diagram illustrating a relationship between the temperature (° C.) and the reduction of weight (% by weight) due to the heating. When the polyamideimide and the epoxy resin are used in combination as shown in FIG. 1, the weight reduces little even at high temperatures, presenting superior heat resistance to that of the epoxy-type coated films.

Moreover, the polyamideimide blended with the epoxy resin exhibits improved workability making it possible to form a container in an excellent condition.

Figure 2:
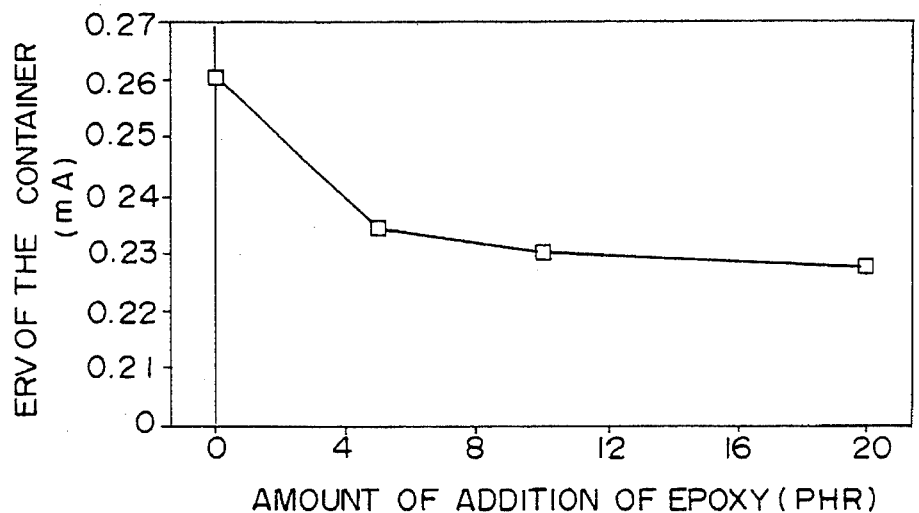
FIG. 2 is a diagram showing a relationship between the enamel rarer value and the blended amount of the polyamideimide blended with an epoxy resin for explaining the third and fourth aspects of the present invention.

Referring further to FIG. 2 which illustrates a relationship between the enamel rarer value (mA) of the container and the amount of the epoxy resin added to the polyamideimide, it will be understood that those blended with the epoxy resin have very smaller enamel rater values than those which are not blended with the epoxy resin, from which it will be recognized that the polyamideimide blended with the epoxy resin effectively prevents the occurrence of cracks and pinholes.

It is important that the coating layer of the laminated material of the present invention contains the fluorine-type resin in an amount of from 60 to 300 parts by weight and, particularly, from 150 to 250 parts by weight per 100 parts by weight of the polyamideimide. When the amount of the fluorine-type resin is smaller than the above range, the cooking properties are lost when directly heated by flame and the draw-formability is deteriorated. When the amount of the fluorine-type resin is greater than the above range, the draw-formability is deteriorated, too, and the coating film loses adhesiveness and corrosion resistance.

According to the present invention in view of the above-mentioned actions, it is desired to use, as the fluorine-type resin, a polytetrafluoroethylene or a tetrafluoroethylene/hexafluoropropylene copolymer, or 10 these two compounds in combination. Most desirably, the fluorine-type resin should be comprised of the polytetrafluoroethylene and the tetrafluoroethylene/hexafluoropropylene copolymer at a weight ratio of from 100:0 to 20:80. The polytetrafluoroethylene exhibits excellent heat resistance and scorch resistance but has somewhat poor film-forming property. The tetrafluoroethylene/hexafluoropropylene copolymer, on the other hand, exhibits excellent film-forming property but has somewhat poor heat resistance and scorch resistance. When the above two compounds are used in combination at the above-mentioned weight ratio, the above-mentioned properties are obtained in a best combination.

The inner coating layer of a composition of the aforementioned polyamideimide and the fluorine-type resin maintains nearly satisfactory film adhesiveness and corrosion resistance when the content is hot-charged into the container that is press-formed or when the hermetically packaged material is sterilized by hot water or by boiling. When the hermetically packaged material is sterilized by retorting, however, the interface peeling takes place between the inner coating and the metal base or, otherwise, so-called under-film corrosion develops under the inner coated film. Therefore, this inner coating layer still has problems in regard to corrosion resistance, preservability of the content, and flavor retentivity, such as permitting iron to elute out and leakage to take place as a result of pitting.

According to the second and fourth aspect of the present invention, the aforementioned defects are effectively overcome by providing a primer layer of the polyamideimide between the surface-treated steel foil and the inner coating layer of a composition of the polyamideimide and the fluorine-type resin. That is, the primer layer of the polyamideimide completely covers the surface of the surface-treated steel foil, forms a protection film which is dense and flawless on the surface-treated steel foil, and adheres well to the film of a composition of the polyamideimide and the fluorine-type resin thereby to prevent the peeling at the interface between them. In the coating of dispersion system of the polyamideimide and the fluorine-type resin, the corrosive components inevitably infiltrates through the interface between them. In the coating structure of the present invention, on the other hand, even if the corrosive components might have infiltrated through the interface, the primer layer of the polyamideimide effectively works as a barrier.

The packaging container of the present invention is useful for cooking the content by heating in a gas range or a microwave range as well as in a microwave oven or an oven toaster. In particular, the packaging container provided with a primer layer of the invention is capable of withstanding even the step of sterilization by retorting.

Figure 3:
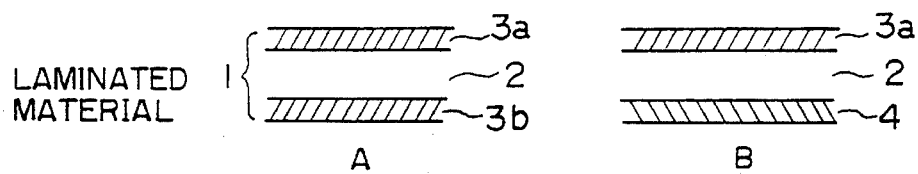
FIG. 3 is a sectional view showing some examples of sectional structures of the laminated materials used for the first aspect of the present invention, wherein the diagram A shows a laminated material of a symmetrical three-layer structure, and the diagram B shows a laminated material of an asymmetrical three-layer structure.

Referring to FIG. 3 which illustrates examples of sectional structures of laminated materials for being press-formed used in the first aspect of the present invention, the diagram A shows a laminated material of a symmetrical three-layer structure, and the diagram B shows a laminated material of an asymmetrical threelayer structure. The laminated material 1 of the symmetrical three-layer structures comprises a surface treated steel foil 2 and coating layers 3a, 3b of a resin composition which contains a polyamideimide and a fluorine-type resin provided on both surfaces of the steel foil.

On the other hand, the laminated material 1 of the asymmetrical three-layer structure comprises the surface-treated steel foil 2, a coating layer 3a of a resin composition which contains the polyamideimide and the fluorine-type resin and is provided on a surface of the steel foil that becomes the inside surface of the container, and a coating layer 4 of another heat-resistant resin provided on a surface of the steel foil that becomes the outside surface of the container.

Figure 4:
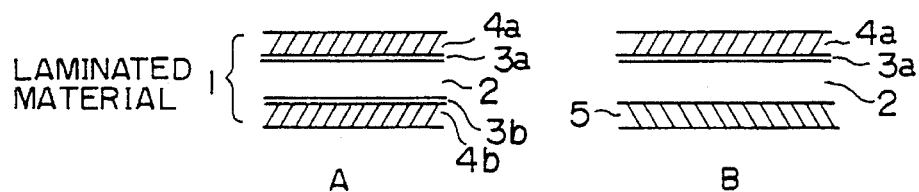
FIG. 4 is a sectional view showing some examples of sectional structures of the laminated materials used for the second aspect of the present invention, wherein the diagram A shows a laminated material of a symmetrical three-layer structure, and the diagram B shows a laminated material of an asymmetrical three-layer structure.

Referring to FIG. 4 which illustrates examples of sectional structures of laminated materials for being press-formed used in the second aspect of the present invention, the diagram A shows a laminated material of a symmetrical structure, and the diagram B shows a laminated material of an asymmetrical structure. The laminated material 1 of the symmetrical structure comprises the surface-treated steel foil 2, primer layers 3a, 3b of the polyamideimide provided on both surfaces of the steel foil, and overcoating layers 4a, 4b of a resin composition which contains the polyamideimide and the fluorine-type resin and is provided on the polyamideimide primer layers. The polyamideimide primer layer 3b may not be provided on the outside surface of the container. Or, the polyamideimide primer layer 3b only may be provided.

On the other hand, the laminated material 1 of the asymmetrical structure comprises the surface-treated steel foil 2, the polyamideimide primer layer 3a provided on a surface of the steel foil that becomes the inside surface of the container, the overcoating layer 4a of a resin composition which contains the polyamideimide and the fluorine-type resin provided on the polyamideimide primer layer, and the coating layer 5 of another heat-resistant resin provided on a surface of the steel foil that becomes the outside surface of the container.

Figure 5:
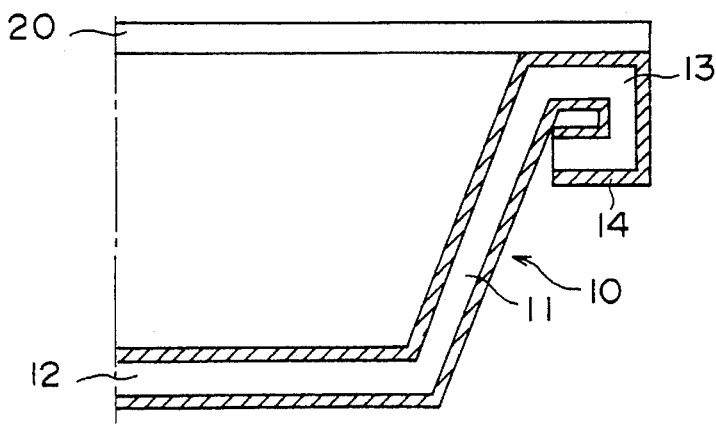
FIG. 5 is a side sectional view showing a heat-resistant packaging container of the present invention.

Referring to FIG. 5 which shows the heat-resistant packaging container of the present invention, the packaging container comprises a container body 10 and a closure 20. The container body 10 is obtained by draw-forming using a press the above-mentioned laminated material 1 in a manner that the coating layer (first aspect) or the overcoating layer (second aspect) of the resin composition containing the polyamideimide and the fluorine-type resin becomes at least the inside surface of the container. The container body 10 comprises a barrel wall 11 which is tapered or is of a cylindrical shape, a bottom portion 12 continuous to the lower end of the barrel wall, and a flange portion 13 continuous to the upper end of the barrel wall. The outer circumference of the flange portion is curled as designated at 14, so that the customers will not get hurt on the fingers. The container body 10 and the closure 20 are in such a relation as to be heat-sealed to each other as will be described later.

The containers of the third and fourth aspects are constituted like the aforementioned containers, except that in the third aspect, the coating layer of the first aspect is further blended with an epoxy resin and in the fourth aspect, the primer layer and the overcoating layer of the second aspect are further blended with an epoxy resin. (Laminated Material)

Examples of the surface-treated steel foil include those steel foils which are subjected to one or two or more kinds of surface treatments such as zinc plating, tin plating, nickel plating, electrolytic chromate treatment, phosphate treatment and chromate treatment. In particular, there can be used an electrolytic chromate-treated steel foil, or a tin foil of bright or mat. It is desired to use the electrolytic chromatetreated steel foil having a thickness of from 5 to 500 μm and, particularly, from 50 to 500 μm.

As the polyamideimide, there can be used a high molecular polymer having an amide recurring unit and an imide recurring unit in the polymer chains. The amide recurring unit (A) and the imide recurring unit (B) may be bonded together in any form such as a regular alternating bond -A-B-, a random alternating bond -AA-B-, a block bond -AA-BB-, or any combination thereof.

There can be used polyamideimides which are widely known having the following formulas:

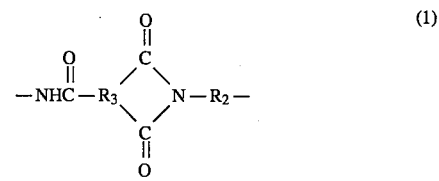

(1)

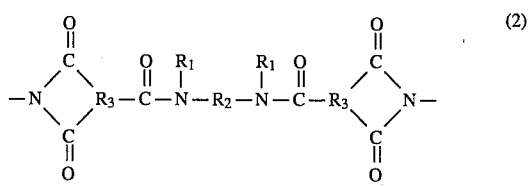

(2)

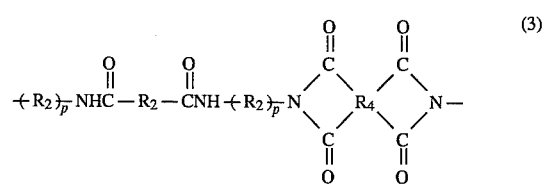

(3)

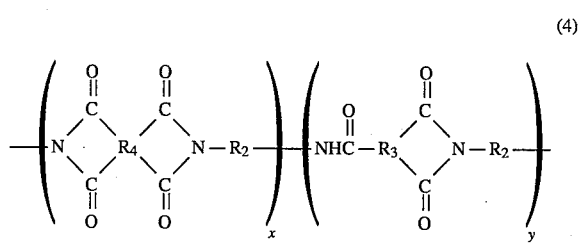

(4)

wherein $R_1$ is a hydrogen atom or a monovalent hydrocarbon group, $R_2$ is a divalent group selected from the group consisting of an aromatic group, an aliphatic group, a cyclic aliphatic group, and a combination of the aromatic group and the aliphatic group, or substituents thereof, $R_3$ is a trivalent group selected from the group consisting of an aromatic group, an aliphatic group, a cyclic aliphatic group, and a combination of the aromatic group and the aliphatic group, or substituents thereof, $R_4$ is a tetravalent group selected from the group consisting of an aromatic group, an aliphatic group, a cyclic aliphatic group, and a combination of the aromatic group an the aliphatic group, or substituents thereof, p is a number of zero or 1, and x and y are numbers that exist at any ratio.

Among the above-mentioned polyamideimides, the one having the structure of the formula (1) and in which the trivalent group $R_3$ is a benzene ring is particularly suited for the object of the present invention.

As the fluorine-type resin, there can be used any fluorine-type resin that has been widely known. Preferably, there can be used, as the fluorine-type resin, a polytetrafluoroethylene, a tetrafluoroethylene/hexafluoropropylene copolymer, or a combination thereof. Most preferably, there can be used, as the fluorine-type resin, the polytetrafluoroethylene and the tetrafluoroethylene/hexafluoropropylene copolymer at a weight ratio of from 100:0 to 20:80 and, particularly from 100:0 to 80:20.

The fluorine-type resin should have a molecular weight which is as great as to form a film. When used as a paint, the fluorine-type resin should have a grain size of generally from 0.1 to 10 µm. The fluorine-type resin having such particle sizes can be easily obtained by subjecting a corresponding monomer to the emulsion polymerization.

The coating layer of the laminated material in the first aspect of the present invention contains the fluorine-type resin in an amount of from 60 to 300 parts by weight and, particularly, from 150 to 250 parts by weight per 100 parts by weight of the polyamideimide. The inner coating layer is provided maintaining a thickness of from 2 to 20 m and, particularly, from 5 to 10 m.

In the laminated material of the second aspect of the present invention, the primer composed of a polyamideimide is provided on the surface-treated steel foil maintaining a thickness of from 0.2 to 10 µm and, particularly, from 1 to 5 m as a solid component. When the thickness is smaller than the above range, there is not obtained sufficiently large resistance against retorting. When the thickness is greater than the above range, on the other hand, there arises disadvantage in workability and in economy.

The overcoating layer contains the fluorine-type resin in an amount of from 60 to 300 parts by weight and, particularly, from 150 to 250 parts by weight per 100 parts by weight of the polyamideimide. It is desired that the overcoating layer has a thickness of from 1 to 20 µm and, particularly, from 4 to 10 µm.

In the third and fourth aspects of the present invention, the epoxy resin that is contained in the polyamideimide should preferably be a bisphenol-type epoxy resin obtained by the polycondensation of an epihalohydrin and bisphenols such as bisphenol A and the like. It is desired that the epoxy equivalent thereof usually ranges from 140 to 10,000 and, particularly, from 180 to 4,000, and the number average molecular weight thereof ranges from 320 to 10,000 and, particularly, from 350 to 4,000.

It is desired that the epoxy resin is contained in the polyamideimide in an amount ranging from 1 to 30 phr and, particularly, from 5 to 20 phr.

The another heat-resistant resin layer provided on the surface of the surface-treated steel foil that becomes the outside surface of the container will be a widely known heat-resistant resin paint such as a phenol resin, an epoxy resin, an amino resin, a xylene resin, an alkyd resin, a bismaleimide resin, a cyanuric acid ester resin, an urethane resin, or a silicone resin used alone or in a combination of two or more kinds. The outer coating layer should have a thickness of from 2 to 20 µm and, particularly, from 5 to 10 µm.

(Production of the laminated material)

In order to produce the laminated materials used in the first and third aspects of the present invention, there is first prepared a paint for coating which is then applied onto the surface-treated steel foil followed by baking thereby to form a coating as contemplated by the present invention.

In order to produce the laminated materials used in the second and fourth aspects of the present invention, furthermore, there are first prepared paints for coating, i.e., a paint for primer and a paint for overcoating, which are then successively applied onto the surface-treated steel foil followed by baking thereby to form a coating as contemplated by the present invention.

In order to prepare the paint for coating, a polymer or a precursor polymer that corresponds to a polyamideimide of the formulas (1) to (4), such as a mixture or a precondensate of a polyamide acid and a polyamideamine or a polyamideimide, or a polymer obtained by the polymerization of a diamidediimidedicarboxylic acid or diimidedicarboxylic acid and a polyvalent amine, is dissolved in an organic solvent like N,N-dimethylamide such as a dimethylformamide, a dimethylacetamide or the like; cyclic ethers such as a tetrahydrofurane, a dioxane or the like; a dimethyl sulfoxide; an aromatic hydrocarbon-type solvent such as a toluene, a xylene, an ethylbenzene or the like; ketones such as a methyl ethyl ketone or the like; an N-methyl-2-pyrrolidone; and phenols such as a phenol, a crezole or the like, thereby to form a varnish.

The precursor polymer of the polyamideimide that is used must have a molecular weight which is large enough to be capable of forming a film. The polyamideimide-forming component should be contained in the varnish at a concentration of generally from 10 to 50% by weight and, particularly, from 20 to 40% by weight.

In the first aspect, the fluorine-type resin is contained in the varnish and in the third aspect, the fluorine-type resin and the epoxy resin are contained in the varnish in amounts mentioned above in order to disperse the fluorine-type resin.

In the second aspect, the varnish is blended, as required, with a blending agent that will be described later to form a primer, and the varnish is further blended with the fluorine-type resin in amounts mentioned above, in order to prepare a paint for overcoating in which the fluorine-type resin is dispersed.

In the forth aspect, the paints for primer and overcoating are prepared in the same manner as in the second aspect, but further blending the varnish with an epoxy resin.

In the present invention, there can be used a dispersant and a surfactant in order to assist the uniform dispersion of the fluorine-type resin. The dispersant and the surfactant should be used in amounts of from 0.1 to 30% by weight with respect to the fluorine-type resin.

The paints for coatings may be blended with blending agents for paints which are known per se such as various coloring agents a filler, an inorganic or organic reinforcing agent, a lubricant, a plasticizer, a leveling agent, a surfactant, a stickness-increasing agent, a stickiness-decreasing agent, a stabilizer, an anti-oxidizing agent, an ultraviolet ray-absorbing agent and a corrosion-preventing agent. Inorganic pigments and inorganic fillers that are blended contribute to improving heat resistance of the coating. Inorganic pigments and inorganic fillers should preferably be blended in amounts of 10 to 40% by weight with respect to the solid coating component.

The paint for coating can be applied to the surface-treated steel foil by a known coating method such as a roll coating, a spray coating, an electrostatic coating, or a doctor blade coating. The paint may be either continuously applied using a coil coat or intermittently applied to the sheet. In the case of a two-step coating consisting of a primer coating and an overcoat coating, the paints will be applied by the wet-on-wet method or the met-on-dry method.

The paint for coating baked to such a degree that the polyamideimide is completely cyclized and condensed and, usually, at a temperature of from 220° to 400° C. and, particularly, from 250° to 350° C. for about 0.1 to about 120 minutes. The coated film can be baked using a known device such as an infrared-ray heating furnace, a hot air heating furnace, a hot air circulation furnace, or a high frequency induction heating.

(Production of a container) A coated and laminated blank having an inner coating layer and an outer coating layer on the inner and outer surfaces of the metal foil is subjected to a known draw-forming and, no required, the outer circumference of the flange portion is curled to obtain a container body. The draw-machining can be effected by using any press consisting of a combination of a male mold and a die (female mold). It is desired to effect the forming by a method described in Japanese Patent Publication No. 4408/1982 by using a tool described in Japanese Patent Publication No. 50645/1981, since it prevents wrinkles from developing near the root of flange of the barrel wall.

The container according to the present invention is used in combination with a closure to hermetically package the content and to cook the content by heating after the closure is opened. The closure consists of a base material and a heat-sealable resin layer (inside surface material).

According to the present invention, it is desired that the flange portion of the container is provided with a resin for heat-sealing so that it can be heat-sealed to the closure. The resin for heat-sealing is applied in advance to the flange portion of the container in the form of a powder, a suspension or a film, or may be applied to the flange portion of the container in a form in which it is dispersed in a thermosetting resin paint such as an epoxy resin, a phenolic resin, an epoxy-phenolic resin, a polyimide resin, a urea resin or the like resin.

As the resin for heat-sealing, there is used an acid-modified olefin-type resin which is obtained by graft-modifying an olefin-type resin with an ethylene-type unsaturated carboxylic acid or an anhydride thereof. Examples of the olefin-type resin trunk polymer include a low-, medium- or high-density polyethylene, a linear low-density polyethylene, a homopolypropylene, a crystalline propylene-ethylene copolymer, a polybutene-1, a polypentene-1, a butene-1/propylene copolymer, and a butene-1/propylene/ethylene tercopolymer. A homopolypropylene is desired from the standpoint of heat resistance. Examples of the ethylene-type unsaturated carboxylic acid or the anhydride thereof include an acrylic acid, a methacrylic acid, a maleic acid, a fumatic acid, a crotonic acid, an acid, a citraconic acid, a 5-norbornene-2,3-dicarboxylic acid, an anhydrous maleic acid, an anhydrous citraconic acid, a 5-norbornene-2,3-dicarboxylic anhydride, and a tetrahydrophthalic anhydride. The maleic anhydride is best suited from the standpoint of heat-sealability. The acid-modified olefin-type resin that is used should contain an acid group at a concentration of from 0.01 to 600 milliequivalent/100 g of resin and, particularly, from 1.0 to 200 milliequivalent/100 g of resin reckoned as the carbonyl group (=CO). In the present invention, a propylen-type resin modified with a maleic anhydride is most desirably used.

As the resin for heat-sealing, furthermore, there can be used such thermoplastic resins as polyolefine such as a crystalline polypropylene, a crystalline propylene-ethylene copolymer, a crystalline polybutene-1, a crystalline poly-4-methylpentene-1, or a low-, medium or high-density polyethylene; an aromatic vinyl polymer such as a polystyrene or a styrene-butadiene copolymer; a halogenated vinyl polymer such as a polyvinyl chloride or a vinylidene chloride resin; a nitrile polymer such as an acrylonitrile-styrene copolymer or an acrylonitrile-styrene copolymer or an acrylonitrile-styrene-butadiene copolymer, polyacids such as a nylon 6, a nylon 6,6, or a para or metaxylyleneadipamide; polyesters such as a polyethylene terephthalate or a polytetramethylene terephthalate; various polycarbonates; or polyacetals such as a polyoxymethylene or the like.

As the base material of the closure, there can be used a aluminum foil or the aforementioned metal foil; a thermoplastic resin film such as a biaxially stretched polyethylene terephthalate film, a biaxially stretched nylon film, or a polycarbonate film; various papers; or a laminated composed of two or more of these materials. An inside surface material is applied thereon to obtain a closure.

As the inside surface material for he closure, there can be used a thermoplastic polyolefin resin of the same type as the aforementioned acid-modified polyolefin or a blend thereof making it possible to accomplish a strong heat-sealed bonding relative to the heat-sealable layer formed on the flange portion of the container. It is desired that the layer of the inside surface material has a thickness of usually from 3 to 100 μm and, particularly, from 3 to 40 μm.

The base material and the inside surface material can be easily joined or stuck together by using the aforementioned acid-modified resin or the urethane-type adhesive. As the outer surface protection coating of the closure. The aforementioned paints for the container body and variety of resin films can be used.

According to the present invention, the content is charged into the container body which, as required, is purged with nitrogen or water vapor and, then, the closure is fitted to the flange portion of the container and is heat-sealed thereto by using a heat-sealing means such as a heat-seal bar, a high frequency induction heating, or an ultrasonic wave irradiation at a temperature of from 170° to 250° C. to accomplish hermetic sealing. The packaging container after hermetically can, as required, be put to the sterilization by hot water. Or, the content may be charged into a separate pouch-like container, sterilized at a temperature of 100° to 135° C. for 10 to 60 minutes, introduced into the packaging container, and is then hermetically sealed therein; i.e., a package is obtained that withstands preservation.

The package can be used for cooking the content by heating.

EXAMPLES

The invention will now be described more concretely by way of the following examples.

EXAMPLE 1

A polyamideamic acid of a structural formula

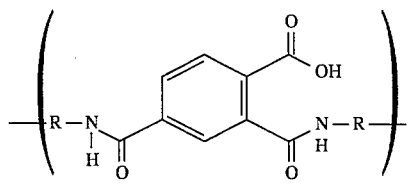
(6)

which is a precursor of an amideimide of a structural formula

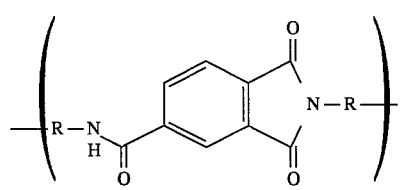
(5)

was dissolved in an N-methylpyrrolidone to prepare a solution of 20% by weight thereof (a polyamideimide paint). To the above solution were added a fluorine-type resin having a composition ratio of polytetrafluoroethylene:tetrafluoroethylene/hexafluoropropylene copolymer=50:50 in an amount of 150 parts by weight and titanium white ($TiO_2$) in an amount of 50 parts by weight per 100 parts by weight of the polyamideimide. The mixture was stirred and dispersed in a ball mill for about one hour to obtain a paint. Xylene and MIBK were used as diluting agents to adjust the solid component concentration to be 23% by weight (a fluorine-type resin-dispersed polyamideimide paint).

The above paint was applied onto a 75 μm-thick TFS (tin-free steel) and was baked in an oven at 250° C. for 30 seconds to form an inside surface which is 5 μm thick. An epoxy-type resin was applied onto the outer surface maintaining a thickness of 5 μm.

By using the thus obtained laminated material, a container having a port diameter of 180 mm and a height of 50 mm was produced by press-forming. The fluorine-type resin-dispersed amideimide resin did not peel off the base material and exhibited favorable formability.

A Chinese dish of fried rice was introduced in an amount of 250 g into the container and was fried on a gas heater with a heating power of 2 liters/min. for 4 minutes. The coated film neither peeled off nor melted, and the content was not scorched, offering favorsole adaptability as a cooking utensil.

EXAMPLE 2

The testing was carried out in the same manner as in Example 1 with the exception of using the fluorine-type having a composition ratio of polytetrafluoroethylene tetrafluoroethylene/hexafluoropropylene copolymer=100:0 in an amount of 230 parts by weight per 100 parts by weight of the polyamideimide.

Comparative Example 1

The testing was carried out in the same manner as in Example 1 with the exception of changing the amount of addition into 50 parts by weight.

Comparative Example 2

The testing was carried out in the same manner as in Example 1 with the exception of changing the composition ratio into polytetrafluoroethylene:tetrafluoroethylene/hexafluoropropylene copolymer=0:100.

Comparative Example 3

The testing was carried out in the same manner as in Example 1 with the exception of adding the fluorinetype resin having a composition ratio of polytetrafluoroethylene-:tetrafluoroethylene/hexafluoropropylene copolymer=100:0 in an amount of 400 parts by weight per 100 parts by weight of the polyamideimide.

Comparative Example 4

A polyether sulfone was dissolved in an N-methylpyrrolidone to prepare a solution of 20% by weight thereof. To this solution was added a polytetrafluoroethylene in an amount of 100 parts by weight per 100 parts by weight of the polyether sulfone. The mixture was stirred and dispersed in a ball mill for about one hour to obtain a paint. Xylene and MIBK were used as diluting agents to adjust the solid component concentration to be 23% by weight.

By using this paint, the testing was carried out in the same manner as in Example 1.

Comparative Example 5

A resin paint (solid content, 28%; the solvent was a mixture of MEK, MKBK and xylene) was prepared by adding 20 parts by weight of a binuclide phenolic resin to 100 parts by weight of an epoxy resin (Epicoat No. x1009, number average molecular weight, 3750 produced by Shell Co.).

By using this paint, the testing was carried out in the same manner as in Example 1.

The results were as shown in Table 1.

TABLE 1

| | Resin (vehicle) | F-type resin composition:polytetrafluoroethylene: tetrafluoroethylene/ hexafluoropropylene copolymer | Added amount of F-type resin (parts by weight) | Solid content concentration (%) | Formability | Stickiness of fried rice |
|---|---|---|---|---|---|---|
| Example 1 | amideimide | 50:50 | 150 | 23 | ○ | ○ |
| Example 2 | amideimide | 100:0 | 230 | 23 | ○ | ⊙ |

TABLE 1-continued

| | Resin (vehicle) | F-type resin composition:poly- tetrafluoroethylene: tetrafluoroethylene/ hexafluoropropylene copolymer | Added amount of F-type resin (parts by weight) | Solid content concentration (%) | Form- ability | Stickiness of fried rice |
|---|---|---|---|---|---|---|
| Comparative Example 1 | amideimide | 50:50 | 50 | 23 | O | X scorched |
| Comparative Example 2 | amideimide | 0:100 | 150 | 23 | O | X scorched |
| Comparative Example 3 | amideimide | 100:0 | 400 | 23 | X pinhole | Δ |
| Comparative Example 4 | polyether sulfone | 100:0 | 100 | 23 | X peeled | — |
| Comparative Example 5 | epoxyphenol | — | — | 28 | O | X melted and peeled |

Example 3

The fluorine-type resin-dispersed polyamideimide paint prepared in Example 1 was used as a paint for overcoating, and the polyamideimide paint without blended with the fluorine-type resin was used as a primer. The polyamideimide primer was applied maintaining a thickness of 5 μm onto a 75 μm-thick TFS (tin-free steel), and the fluorine-type resin-dispersed polyamideimide overcoating was applied thereon maintaining a thickness of 5 μm. These coatings were then baked in an oven at a temperature of 250° C. for 30 seconds to form an inside surface. An epoxy-type resin was applied onto the outside surface maintaining a thickness of 5 μm.

Furthermore, a modified PP in which has been dispersed 10 parts by weight of an epoxyphenol resin was applied maintaining a thickness of 5 μm onto a portion that corresponds to the flange portion of the laminated material which is to be press-formed.

In order to obtain a closure, furthermore, two layers consisting of a 10 μm-thick ethylene-propylene copolymer and a 15 μm-thick polypropylene modified with a maleic anhydride (modified PP is on the aluminum foil side) were co-extruded between a laminated base material of 12 μm-thick PET/15 μm-thick biaxially stretched nylon/20 μm-thick aluminum foil and a co-extruded film which consists of a 30 μm-thick ethylene-propylene copolymer support layer and a 5 μm-thick blended layer of 70% by weight of a polypropylene and 30% by weight of a low-density polyethylene. Through the heat-treatment in an oven, there was obtained a laminated material having a PP-LDPE blended layer as a sealing layer.

Thus the obtained laminated material was press-formed into a container having a port diameter of 180 μmm and a height of 50 μmm. The Chinese dish of fried rice was introduced in an amount of 250 g into the container which was then heat-sealed to the closure under a condition of 220° C. for 1.5 seconds, followed by the retort processing at 120° C. for 30 minutes.

Thereafter, the closure material was removed, and the content was fried on a gas heater with a heating power of 2 liters/min. for 4 minutes. The coated film neither peeled off nor melted, and the content was not scorched, offering favorable adaptability as a cooking utensil.

Example 4

The testing was carried out in the same manner as in Example 3 with the exception of using the fluorine-type resin having a composition ratio of polytetrafluoroethylene- :tetrafluoroethylene/hexafluoropropylene copolymer=100:0 in an amount of 230 parts by weight per 100 parts by weight of the polyamideimide.

Comparative Example 6

The testing was carried out in the same manner as Example 3 with the exception of changing the amount of addition into 50 parts by weight.

Comparative Example 7

The testing was carried out in the same manner as in Example 3 with the exception of changing the composition ratio into polytetrafluoroethylene:tetrafluoroethylene/ hexafluoropropylene copolymer=0:100.

Comparative Example 8

The testing was carried out in the same manner as in Example 3 with the exception of using the fluorine-type resin having a composition ratio of polytetrafluoroethylene- :tetrafluoroethylene/hexafluoropropylene copolymer=100:0 in an amount of 400 parts by weight per 100 parts by weight of the polyamideimide.

Comparative Example 9

The testing was carried out in the same manner as in Example 3 but without providing the primer layer.

The results were as shown in Table 2.

TABLE 2

| | Resin (vehicle) | F-type resin composition;polytetrafluoroethylene: tetrafluoroethylene/ hexafluoropropylene copolymer | Added amount of F-type resin (parts by weight) | Solid content concentration (%) | Retort adaptability (enamel * rater value of container) | Stickiness of fried rice |
|---|---|---|---|---|---|---|
| Example 3 | amideimide | 50:50 | 150 | 23 | ○ (0.0) | ○ |
| Example 4 | amideimide | 100:0 | 230 | 23 | ○ (0.1) | ⊙ |
| Comparative Example 6 | amideimide | 50:50 | 50 | 23 | ○ (0.0) | X scorched |
| Comparative Example 7 | amideimide | 0:100 | 150 | 23 | ○ (0.0) | X scorched |
| Comparative Example 8 | amideimide | 100:0 | 400 | 23 | X (3.0) | Δ |
| Comparative Example 9 | amideimide | 50:50 | 150 | 23 | X (6.5) | ○ |
| Comparative Example 10 | amideimide | 100:0 | 230 | 23 | X (250) | ⊙ |

*: Current in mA when the container is filled with 1% NaCl and a voltage of 6.3 V is applied.

Example 5

An amideimide of a structure formula

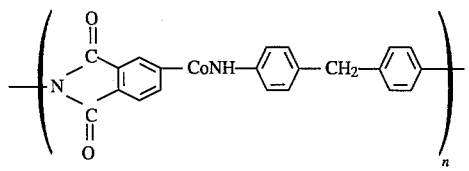 (7)

was dissolved in an N-methylpyrrolidone to prepare a solution of 25% by weight thereof. To this solution were added and dispersed an epoxy resin having a number average molecular weight of 355 in an amount of 5 parts by weight, a fluorine-type resin having a composition ratio of polytetrafluoroethylene:tetrafluoroethylene/hexafluoropropylene copolymer=50:50 in an amount of 150 parts by weight, and titanium white ($TiO_2$) in an amount of 50 parts by weight per 100 parts by weight of the polyamideimide, in order to obtain a paint. Xylene and MIBK were used as diluting agents to obtain a paint for inside surface having a solid component concentration of 32% by weight.

Furthermore, the above amideimide was dissolved in the N-methylpyrrolidone to prepare a solution of 25% by weight thereof. To this solution was added carbon black in an amount of 7 parts by weight per 100 parts by weight of the polyamideimide to obtain a paint for outside surface having a solid component concentration of about 24.5% by weight.

These paints were applied onto the inner and outer surfaces of a 75 μm-thick TFS (tin-free steel) maintaining a thickness of 4 μm, respectively, and were baked in an oven under the conditions of 250° C. for 25 seconds.

Thus the obtained laminated material was press-formed into a container having a port diameter of 180 mm and a height of 50 mm. The coated films did not peel off the base material and exhibited favorable formability.

The Chinese dish of fried rice was introduced in an amount of 250 g into the container and was fried on the gas heater with a heating power of 2 litters/min. for 4 minutes. The coated film neither peeled off nor melted, and the content was not scorched, offering favorable adaptability as a cooking utensil.

Example 6

The testing was carried out in the same manner as in Example 5 with the exception of changing the composition ratio into polytetrafluoroethylene:tetrafluoroethylene/hexafluoropropylene copolymer=100:0.

Example 7

The testing was carried out in the same manner as in Example 6 with the exception of changing the epoxy content into 20 phr.

Example 8

The testing was carried out in the same manner as in Example 6 with the exception of using the fluorine-type resin in an amount of 230 parts by weight.

Comparative Example 11

The testing was carried out in the same manner as in Example 8 with the exception of changing the epoxy content into 0 phr.

Comparative Example 12

The testing was carried out in the same manner as in Example 6 with the exception of changing the epoxy content into 40 phr.

Comparative Example 13

The testing was carried out in the same manner as in Example 5 with the exception of changing the amount of addition into 50 parts by weight.

Comparative Example 14

The testing was carried out in the same manner as in Example 5 with the exception of changing the composition ratio into polytetrafluoroethylene/tetrafluoroethylene/hexafluoropropylene copolymer=0:100.

Comparative Example 15

The testing was carried out in the same manner as in Example 6 with the exception of changing the amount of the fluorine-type resin into 400 parts by weight.

Comparative Example 16

A polyether sulfone was dissolved in the N-methylpyrrolidone to prepare a solution of 20% by weight thereof. To this solution was added a polytetrafluoroethylene in an amount of 100 parts by weight per 100 parts by weight of the polyether sulfone. The mixture was stirred and dispersed in a ball mill for about one hour to obtain a paint. Xylene and MIBK were used as diluting agents to adjust the solid component concentration to be 23 by weight.

By using the above paint, the testing was carried out in the same manner as in Example 5.

Comparative Example 17

A resin paint (solid content, 28

; the solvent was a mixture of MEK, MIBK and xylene) was prepared by adding 20 parts by weight of a binuclide phenolic resin to 100 parts by weight of an epoxy resin (Epicoat No. 1009, a number average molecular weight of 3750 manufactured by Shell Co.).

By using this paint, the testing was carried out in the same manner as in Example 5.

The results were as shown in Table 3. The formability and the long-term preservability were evaluated with an enamel rater value of the container as an index.

mer=50:50 in an amount of 150 parts by weight and titanium white ($TiO_2$) in an amount of 50 parts by weight per 100 parts by weight of the polyamideimide, in order to obtain a paint. Xylene and MIBK were used as diluting agents to obtain a paint for overcoating the inside surface having a solid component concentration of 32%.

To the primer was added carbon black in an amount of 7 parts by weight per 100 parts by weight of the polyamide to obtain a paint for outside surface having a solid component concentration of about 24.5

By using these paints, the primer was applied maintaining a thickness of 4 μm and the overcoating was applied maintaining a thickness of 4 μm onto the 75 μm -thick TFS (tin-free steel) and both of them were baked in an oven under the condition of 250° C. for 25 seconds to form the inside surface. Onto the outside surface, also applied maintaining a thickness of 4 μm under the same baking conditions.

Furthermore, the modified PP in which has been dispersed 10 parts by weight of the epoxyphenol resin was applied maintaining a thickness of 5 μm onto a portion that corresponds to the flange portion of the laminated material that is to be press-formed.

In order to obtain a closure, furthermore, two layers consisting of a 10 μm-thick ethylene-propylene copolymer and 15 μm-thick polypropylene modified with a maleic anhydride (modified PP is on the aluminum foil side) were

TABLE 3

|  | F-type resin composition polytetrafluoroethylene: tetrafluoroethylene/ hexafluoropropylene | Added amount of F-type resin (parts by weight) | Enamel rater value of container* (formability, preservability) | Stickiness of fried rice | Epoxy content (phr) |
|---|---|---|---|---|---|
| Example 5 | 50:50 | 150 | 15.2 | ○ | 5 |
| Example 6 | 100:0 | 150 | 17.8 | ○ | 5 |
| Example 7 | 100:0 | 150 | 10.6 | ○ | 20 |
| Example 8 | 100:0 | 230 | 24.0 | ⊙ | 5 |
| Comparative Example 11 | 100:0 | 230 | 51.0 dotted corrosion | ○ | 0 |
| Comparative Example 12 | 100:0 | 150 | 9.2 | X melted and peeled | 40 |
| Comparative Example 13 | 50:50 | 50 | 8.6 | X scorched | 5 |
| Comparative Example 14 | 0:100 | 150 | 12.8 | X scorched | 5 |
| Comparative Example 15 | 100:0 | 400 | 138.0 dotted corrosion | Δ | 5 |
| Comparative Example 16 | 100:0 | 100 | film peeled | — | 0 |
| Comparative Example 17 | — | — | 18.2 | X melted and peeled | — |

Note:
*:Current in mA when the container is filled with 1% NaCl and a voltage of 6.3 V is applied.
Conditions for developing corrosion consisted of a preservation of one month at a temperature of 30° C. and a humidity of 80 RH%.

Example 9

The amideimide of the aforementioned structural formula (7) was dissolved in the N-methylpyrrolidone to prepare a solution of 25% by weight thereof. To this solution was added an epoxy resin having a number average molecular weight of 355 in an amount of 5 parts by weight per 100 parts by weight of the polyamideimide. Xylene and MIBK were used as diluting agents to obtain a primer having a solid component concentration of 24%.

To the above primer were added and dispersed a fluorine-type resin having a composition ratio of polytetrafluoroethylene:tetrafluoroethylene/hexafluoropropylene copolyco-extruded between a laminated base material of 12 μm-thick PET/15 μm-thick biaxially stretched nylon/20 μm-thick aluminum foil and a co-extruded film which consists of a 30 μm-thick ethylene-propylene copolymer support layer and a 5 μm-thick blended layer of 70% by weight of a polypropylene and 30% by weight of a low-density polyethylene. Through the heat-treatment in an oven, there was obtained a laminated material having a PP-LDPE blended layer as a sealing layer.

The thus obtained laminated material was press-formed into a container having a port diameter of 180 μmm and a height of 50 μmm. The Chinese dish of fried rice was introduced in an amount of 250 g into the container. 500 g of a 1% NaC1 solution and 0.4% of an acetic acid solution were also introduced. The containers were then heat-sealed to the closure at 220° C. for 1.5 seconds and was subjected to the retort processing at 120° C. for 30 minutes.

The closure was then removed, and the rice contained in the container was fried on the gas heater with a heating power of 2 liters/min. for 4 minutes. The coated film neither peeled off nor melted, and the content was not scorched, offering favorable adaptability as a cooking utensil.

Moreover, the container containing 1% of NaCl solution and 0.4% of acetic acid solution was preserved at 50° C. for one month. The inside surface of the container was observed but there were found no dotted corrosion due to pinholes.

Example 10

The testing was carried out in the same manner as in Example 9 with the exception of changing the composition ratio into polytetrafluoroethylene:tetrafluoroethylene/hexafluoropropylene copolymer=100:0.

Example 11

The testing was carried out in the same manner as in Example 10 but changing the epoxy content to 20 phr.

Example 12

The testing was carried out in the same manner as in Example 10 but changing the amount of the fluorinetype resin into 230 parts by weight.

Comparative Example 18

The testing was carried out in the same manner as in Example 12 but changing the epoxy content into 0 phr.

Comparative Example 19

The testing was carried out in the same manner as in Example 10 but changing the epoxy content into 40 phr.

Comparative Example 20

The testing was carried out in the same manner as in Example 9 but changing the amount of addition into 50 parts by weight.

Comparative Example 21

The testing was carried out in the same manner as in Example 9 but changing the composition ratio into polytetrafluoroethylene:tetrafluoroethylene/hexafluoropropylene copolymer=0:100.

Comparative Example 22

The testing was carried out in the same manner as in Example 9 with the exception of using the fluorine-type resin having a composition ratio of polytetrafluoroethylene:tetrafluoroethylene/hexafluoropropylene copolymer=100:0 in an amount of 400 parts by weight.

Comparative Example 23

The testing was carried out in the same manner as in Example 9 but without providing the primer layer, Comparative Example 24

The testing was carried out in the same manner as in Example 12 but without providing the primer layer, The results were as shown in Table 4,

TABLE 4

|  | F-type resin composition polytetrafluoroethylene: tetrafluoroethylene/ hexafluoroethylene | Added amount of F-type resin (parts by weight) | Adaptability to retort after 1 month at 50° C. (*enamel rater value -container) | Stickiness of fried rice | Epoxy content (phr) |
| --- | --- | --- | --- | --- | --- |
| Example 9 | 50:50 | 150 | ○ (0.03) no dotted corrosion | ○ | 5 |
| Example 10 | 100:0 | 150 | ○ (0.034) no dotted corrosion | ○ | 5 |
| Example 11 | 100:0 | 150 | ○ (0.028) no dotted corrosion | ○ | 20 |
| Example 12 | 100:0 | 230 | ○ (0.05) no dotted corrosion | ⊙ | 5 |
| Comparative Example 18 | 100:0 | 230 | X (0.3) tiny dotted corrosion | ○ | 0 |
| Comparative Example 19 | 100:0 | 150 | ○ (0.0) | X melted and peeled | 40 |
| Comparative Example 20 | 50:50 | 50 | ○ (0.0) | X scorched | 5 |
| Comparative Example 21 | 0:100 | 150 | ○ (0.0) | X scorched | 5 |
| Comparative Example 22 | 100:0 | 400 | X dotted corrosion | Δ | 5 |
| Comparative Example 23 | 50:50 | 150 | X dotted corrosion | ○ | 5 |
| Comparative Example 24 | 100:0 | 230 | X dotted corrosion | ⊙ | 5 |

*: Current in mA when the container is filled with 1% NaCl and a voltage of 6.3 V is applied.
Conditions for developing corrosion consisted of a preservation for one month at 30° C. and a humidity of 80 RH%.

We claim:

1. A packaging container for cooking retort-sterilized contents and capable of safely preserving the contents for an extended period of time without refrigeration which comprises a container body obtained by draw-forming a laminated material and a closure, said container body comprising a wall, a bottom portion and a flange portion, the closure being heat-sealed to the flange portion of the container body wherein said laminated material comprises (i) a surface-treated steel foil, (ii) a primer layer of a resin composition comprising a polyamideimide and 5 to 30 parts by weight per 100 parts of said polyamideimide of an epoxy resin provided on at least one surface of said steel foil that becomes an inside surface of the container body, and (iii) an overcoating layer of a resin composition which comprises (A) a polyamideimide (B) 5 to 30 parts by weight per 100 parts by weight of said polyamideimide of an epoxy resin and (C) 60 to 300 parts by weight, per 100 parts by weight of said polyamideimide, of a fluorinecontaining resin comprising a composition which contains polytetrafluoroethylene and tetrafluoroethylene/hexafluoroethylene copolymer in a weight ratio of from 100:0 to 20:80 provided on said primer layer.

2. A packaging container according to claim 1, wherein said primer layer has a thickness of from 0.2 to 10 μm, and said overcoating layer has a thickness of from 1 to 20 μum.

3. A packaging container according to claim 1, wherein said surface-treated steel foil is an electrolytically chromate-treated steel foil having a thickness of from 50 to 500 μm.

* * * * *